United States Patent [19]

Rapoport

[11] Patent Number: 5,286,772
[45] Date of Patent: Feb. 15, 1994

[54] SYNERGISTIC COMPOSITIONS FOR THE PREVENTION OF POLYMER DEGRADATION

[75] Inventor: Natalya Rapoport, Salt Lake City, Utah

[73] Assignee: The University of Utah, Salt Lake City, Utah

[21] Appl. No.: 982,490

[22] Filed: Nov. 27, 1992

[51] Int. Cl.⁵ ............................................. C08K 5/13
[52] U.S. Cl. ................................. 524/345; 524/100; 524/291; 524/330; 524/335; 524/340; 524/358; 524/237
[58] Field of Search ............... 524/358, 345, 335, 340, 524/100, 291, 330

[56] References Cited

U.S. PATENT DOCUMENTS

| | | | |
|---|---|---|---|
| 2,181,121 | 11/1939 | Downing et al. | 524/237 |
| 2,789,912 | 4/1957 | Gleim | 524/237 |
| 3,004,001 | 10/1961 | Robbins et al. | 260/45.95 |
| 3,043,672 | 7/1962 | Ecke et al. | 44/69 |
| 3,235,532 | 2/1966 | Hopper et al. | 260/45.95 |
| 3,249,582 | 5/1966 | Schmidt et al. | 524/237 |
| 3,255,151 | 6/1966 | Hecker et al. | 524/345 |
| 3,310,509 | 3/1967 | Fukumoto | 260/23 |
| 3,440,209 | 4/1969 | Harris et al. | 524/358 |
| 3,502,613 | 3/1970 | Berger | 45/60 |
| 3,929,702 | 12/1975 | Miller et al. | 260/27 |
| 4,454,270 | 6/1984 | Kolodchin et al. | 524/392 |
| 4,590,221 | 5/1986 | Kühnel et al. | 521/85 |
| 4,600,740 | 7/1986 | Stephen et al. | 524/120 |
| 4,670,495 | 6/1987 | Evans | 524/155 |
| 4,757,102 | 6/1988 | Ravichandran et al. | 524/95 |
| 4,812,501 | 3/1989 | Odorisio et al. | 524/117 |

OTHER PUBLICATIONS

J. Pospisil et al., *J. Polymer Science* Symposium No. 40, 319-325 (1973).

*Primary Examiner*—Veronica P. Hoke
*Attorney, Agent, or Firm*—James L. Sonntag

[57] ABSTRACT

A polyolefin composition is disclosed comprising polyolefin with a synergistic antioxidant composition of a phenolic oxidation inhibitor and synergist capable of reacting with the phenoxyl radicals to form a phenolic group and regenerate the phenolic oxidation inhibitor. In a preferred embodiment of the invention, the synergist also acts as a metal-complexing agent capable of complexing with trace transition-metal-ions contaminants in the polyolefin.

11 Claims, 1 Drawing Sheet

SYNERGISTIC COMPOSITIONS FOR THE PREVENTION OF POLYMER DEGRADATION

FIELD OF THE INVENTION

This invention relates to prevention of degradation in polymers.

Background of the Invention

Polymers are often formed into shapes or films that become stress components of a structure or are otherwise subjected to stress. While these shapes perform satisfactorily, in the presence of oxygen the polymer will degrade over time due to oxidation of the polymer chain. This causes a reduction in the strength of the polymer and a possible failure of the shape when stressed. A common oxidation process begins with auto-oxidation of the polymer chain, often induced by actinic radiation. The auto-oxidation produces reactive radicals that migrate from the initial oxidation site and initiate oxidation reactions in new sites in the polymer. The new oxidation reactions in turn produce more radicals that migrate and initiate further oxidation reactions. The oxidation of the polymer degrades the structural integrity until the shape finally fails by catastrophic cracks forming in the shape.

In an effort to inhibit the oxidation process, numerous oxidation inhibitors have been used, which as additives to the polymer preferentially react with the reactive radicals, and reduce their availability for reaction. While these additives are effective in inhibiting oxidation, the inhibition of oxidation on some polymer systems becomes less effective when the polymer shape is stressed, i.e., a shape under continual stress will often fail sooner that would be expected from degradation due to oxidation. Therefore, there is a need for a polymer system, particularly for polymers subjected to stress, that shows greater oxidation resistance.

U.S. Pat. No. 3,043,672 to Ecke, et al. discloses the protection of organic materials by the addition of a 3,5-dialkyl catechol having alkyl groups containing from 4 to 10 carbon atoms characterized in that said alkyl groups contain a branched chain on the carbon atom immediately adjacent the benzene nucleus. Examples include 3,5-di-(1',1'-dimethylnonyl) catechol, 3,5-di-(1',1'-dimethylhexyl)catechol, 3,5-di-(1',1'-dimethylpropyl)catechol, and the like. The organic materials that may be protected include certain synthetic high molecular weight polymers, such as butadiene/acrylonitrile mixed polymer, sulfur vulcanized natural rubber, butyl rubber, polyethylene, and polystyrene.

U.S. Pat. No. 3,235,532 to Hopper, et al. discloses polyolefin compositions containing a major amount of a solid polymer of an alpha olefin having 2 to 8 carbon atoms in the molecule, and a minor amount of boric acid. The composition may also contains a phenolic type inhibitor and a sulfur-containing costabilizer.

U.S. Pat. No. 3,502,613 to Berger discloses propylene stabilized against actinic radiation and heat degradation by incorporating a combination of light stabilizers consisting of 2,4-di-tert-alkylphenyl, 3,5-di-tert-alkyl-4-hydroxybenzoate, 2-(2-hydroxy-3,5-dialkylphenyl)-chlorobenzotriazole, and a heat stabilizer such as an alkylated phenol or a dialkyl ester of beta-thiodipropionic acid.

U.S. Pat. No. 4,454,270 to Kolodchin et al. discloses an antioxidant-protected polyolefin with addition of a compound selected from certain bipyridines and amines.

U.S. Pat. No. 4,590,221 to Kühnel et al. discloses a method for producing foam polyolefin products with the following stabilizers; phenolic antioxidants, substituted benzophenones and/or benzotriazoles, and sterically hindered amines.

U.S. Pat. No. 4,600,740 to Stephan et al. discloses hindered dydroxybenzyl hexaalkylkiphenylmethane derivatives for use as stabilizers for resins made from ethylenically unsaturated monomers.

U.S. Pat. No. 4,670,495 to Evans et al. discloses substances for stabilizing plastics comprising o-bridged polynuclear polyphenols which contain at least one organic radical for each phenyl nucleus.

U.S. Pat. No. 4,757,102 to Ravichandran et al. discloses substituted aminoxy alkylamine derivatives effective in stabilizing organic materials against oxidation.

U.S. Pat. No. 4,812,501 to Odorisio et al. discloses compounds effective as antioxidants which comprises a 1,3,2-oxazaphospholidine derivative.

Other additives are sometimes added to enhance a particular property of the polymer system. For example, U.S. Pat. No. 3,004,001 to Robbins et al. discloses odor inhibitors for use with olefin polymers. The odor inhibitors are added with antioxidants of the bisphenol type, substituted phenols, or phenylene diamine. The odor inhibitors are alpha-hydroxy ketones of the formula RCHOHCOR', wherein R and R' are alkyl, aryl, cycloalkyl, aralkyl and alkaryl radicals, and the total number of carbon atoms in R and R' does not exceed 18.

U.S. Pat. No. 3,310,509 to Fukumoto, et al. discloses a reformed dyeable polyolefin composition with improved stability against discoloration comprising an alkylphenol-type antioxidant, a transition-metal-containing polyolefin and a specific tin compound.

U.S. Pat. No. 3,929,702 to Miller et al. discloses a polypropylene composition that can be plated with metal. The polypropylene incorporates a polyhydroxy aromatic compound, and a rosinous material, and a nucleating agent. Suitable polyhydroxy aromatic compounds include certain bisphenol, and dihydroxybenzene-type compounds. Examples of dihydroxybenzene-type compounds are resorcinol and substituted resorcinols.

OBJECTS OF THE INVENTION

It is, therefore, an object of the invention to provide a polyolefin composition with improved resistance to oxidation.

It is also an object of the invention to provide a polyolefin composition that has improved durability when subjected to stress.

Further objects of the invention will become evident in the description below.

SUMMARY OF THE INVENTION

An embodiment of the invention is a composition comprising;

(a) a polyolefin;

(b) a phenolic oxidation inhibitor having at least one phenolic group which react with free radicals in the polyolefin to form phenoxyl radicals;

(c) a synergist capable of reacting with the phenoxyl radicals to form a phenolic group and regenerate the phenolic oxidation inhibitor.

In a preferred embodiment of the invention, the synergist (c) also acts as a metal-complexing agent capable of complexing with transition metal ions.

The polyolefins suitable for the present invention include, but are not limited to polymers of ethylene, such as low-density polyethylene, and high-density polyethylene; polymers of α-olefins, such as propylene, 1-butene, 4-methylpentene, and higher homologs, and random and block copolymers of these with ethylene. Also included are block or random copolymers of at least one polyolefin with any other polymer.

The preferred polyolefins are those that are manufactured using a transition-metal catalyst. These include stereospecific polymers, particularly stereospecific polypropylenes, and high-density polyethylene (HDPE). Polymers, such as low-density polyethylene (LDPE), manufactured in systems with no transition-metal catalyst, however, are also contemplated in the present invention. It is believed that the synergistic oxidation-inhibition effect of the phenolic antioxidant and the synergist is due to an efficient regeneration of the initial phenolic antioxidant, as further explained below. In addition, the oxidation inhibition is also due in the preferred embodiment to deactivation of transition-metal ions as oxidation catalyst sites.

The transition-metal ions present in the polyolefin are metal ions of Groups IB, IIB, IIIB, IVB, VB, VIB, VIIB, and VIII (Chemical Engineers Handbook, Fifth Edition). The transition metal ions are usually present in traces as a contaminant, and may be the residue of any previous manufacturing or treatment process of the polymer. Typically the transition-metal ion is a residue of the polymerization catalyst. These are transition-metal ions that become bound to chain ends and thereby included into polymer matrix. Accordingly they remain in the polymer matrix after polymer purification in the manufacturing process. Processes for making polypropylene using transition metal catalysts are well known in the art, and include liquid phase and gas phase processes.

The transition-metal ions may be distributed randomly throughout the matrix, or may be in clusters or there may be other variations in distribution, depending on the particular polymer system and its manufacturing history. Typically the transition metal is present in a trace between about 30 ppm and about 300 ppm, as measured by the ash number. Since many polyolefins, including, for example, stereospecific polypropylenes, are manufactured by processes using transition metal catalysts, the present invention is particularly advantageous for shapes, fibers and films of these polymers.

Suitable phenolic oxidation inhibitors are of the alkylphenol type and are selected from the group consisting of monophenolic antioxidants, methylene-bis-phenolic antioxidants, tris-phenolic antioxidants, and tetraphenolic antioxidants. Typical examples include, but are not limited to di-tert-butyl-p-cresol, 2,2'-methylene-bis(4-methyl-6-tert-butylphenol), 4,4'-methylene-bis(2,6'-di-tert-butylphenol), 4,4'-methylene-bis(2,6-di-tert-butylphenol), 2,6-bis(2'-hydroxy-3'-tert-butyl-5'-methylbenzyl)-4-methylphenol, 1,1,3-tris(2-methyl-4-hydroxy-5-tert-butylphenyl) butane, 2,2'-methylene-bis(4-methyl-6-cyclohexylphenol), 4,4'-methylene-bis(2-methyl-6-tert-butylphenol), 6-(4-hydroxy-3,5-di-tert-butyl-phenylcyclohexylamino)-2,4-bis(n-octylthio)-1,3,5-triazine,(4-hydroxy-3,5-di-tert-butyl)benzyl-phosphonicacid di-n-octodecyl ester, and the phenolic antioxidants used in the examples below.

The phenolic antioxidant is typically used an amount at or greater than about $10^{-3}$ mols antioxidant per kg polyolefin. This usually corresponds to an amount up to about 0.5 wt. %, preferably between about 0.05 and 0.5 wt. %, of antioxidant to polyolefin.

The synergists of the present invention, as defined herein, are agents capable of reacting with the phenoxyl radicals, which were formed by reaction of the phenolic inhibitor with free radicals in the polyolefin. The reaction with the phenoxyl radical regenerates the phenolic oxidation inhibitor by reforming the phenolic group. The reaction also forms a radical of synergist that is more stable the phenoxyl radicals, and accordingly less prone to participate in polymer oxidation reaction with polymer hydroperoxide, which leads to formation of new radicals (branching of kinetic chains). Part of the synergistic effect may be also due to alkyl radical trapping.

Preferably the synergist is also capable of forming a complex with transition-metal ions, which may be present in the polyolefin. The synergist must be capable of surviving the processing and compounding of the polymer. Suitable synergists with metal-complexing ability include, but are not limited to oxiquinones, substituted catechols in which at least one substituent is located on the carbon next to the carbon with the hydroxyl group, sterically hindered derivatives of bis(2-hydroxy-benzaldehyde) ethylene diimine, and sterically hindered o-benzoquine hydroxyanilides.

The amount of synergist in the composition of the invention is preferably between 0.01 to 0.05 mol/kg agent to polymer, preferably near 0.05 mol/kg. Larger amounts may also be suitable.

The synergist is introduced into the composition in any suitable manner, for example, in the same matter as the phenolic oxidation inhibitor and any other additives during the compounding step.

DETAILED DESCRIPTION OF THE INVENTION

Phenolic Inhibitor Regeneration

Figure 1:
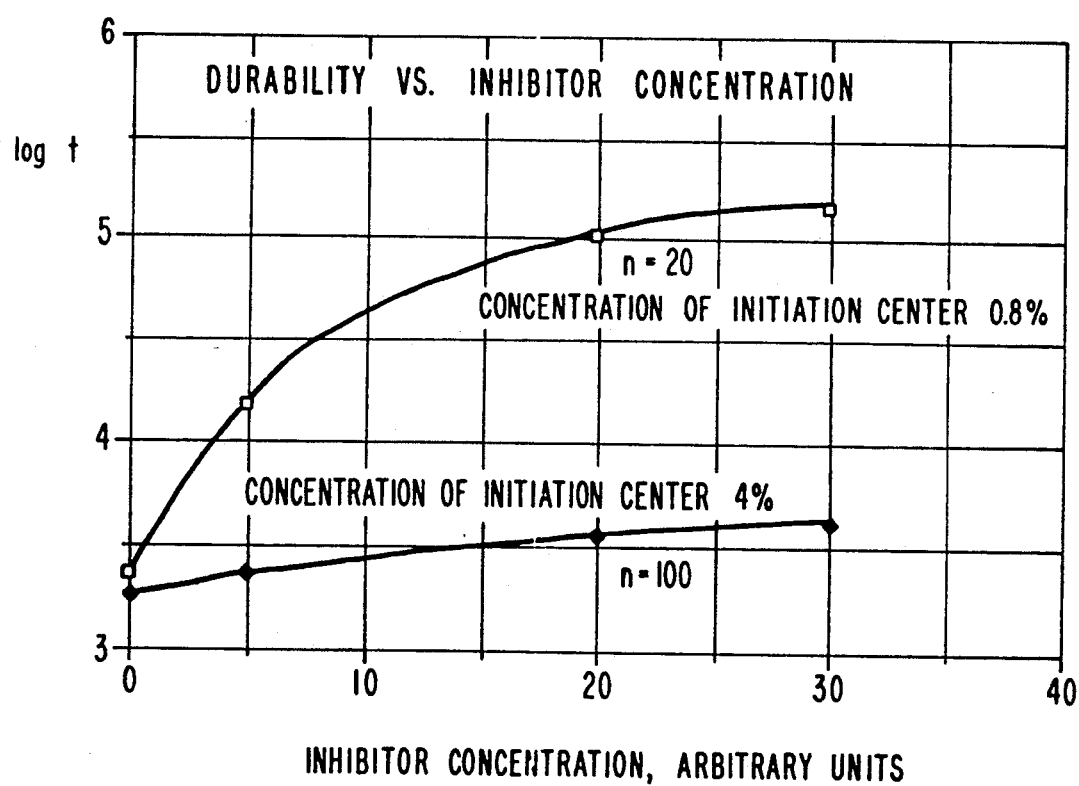
FIG. 1 is a graph illustrating a Monte Carlo simulation of a preferred embodiment of the invention.

The synergistic effect between phenolic antioxidant and synergists of the invention involves inhibitor regeneration in the process of oxidation and possibly alkyl radical trapping. The phenolic inhibitor (PhOH) functions in general by trapping polymer free radicals ($RO_2\cdot$) to replace them with a phenoxyl radical ($PhO\cdot$):

$$RO_2\cdot + PhOH \rightarrow ROOH + PhO\cdot \qquad (1)$$

The phenoxyl radical then reacts with another polymer free radical giving nonactive products:

$$PhO\cdot + RO_2\cdot \rightarrow \text{nonactive products} \qquad (2)$$

In this way polymer active radicals are trapped and polymer oxidation is slowed. The inhibitor (PhOH) is gradually consumed in reaction (1).

However it has been found that some compounds, which include the synergists used in the present invention, can react with phenoxyl radicals to regenerate original phenolic antioxidant as follows:

$$PhO\cdot + A \rightarrow PhOH + A\cdot \qquad (3)$$

followed by the reaction:

$$A\cdot + RO_2 \rightarrow \text{nonactive products} \quad (4)$$

In this way initial phenolic inhibitor (PhOH) is regenerated.

The exchange of phenoxyl radicals for the radicals of a synergistic additive was confirmed by electron spin resonance investigation (ESR) of radicals generated by UV-irradiation in preoxidized polypropylene samples. Five samples were prepared for this investigation. (PPR and PPH are polypropylenes. Irganox 1010 TM and Irganox 1076 TM are phenolic oxidation inhibitors. These are specifically defined below in the Examples.)
Sample 1—PPH, uninhibited.
Sample 2—PPH stabilized by Irganox 1010 TM and a hydroperoxide decomposer, dilaurilthiodipropionate.
Sample 3—PPR stabilized with Irganox 1076 TM alone.
Sample 4—PPR with a synergist alone, 3,5-di-tert-butylcatechol.
Sample 5—PPR stabilized with a composition of 3,5-di-tert-butylcatechol and Irganox TM 1076.

This investigation revealed that in uninhibited Sample 1, only peroxide radicals were formed, as would be expected. In sample 2 and 3, the ESR spectrum showed a superposition of spectrums for phenoxyl radicals (from the phenolic oxidation inhibitors) and peroxide radicals, whereas in samples 4 and 5 radicals detected were identical, belonging to the synergist agent, 3,5-di-tert-butylcatechol, with no evidence of neither phenoxyl radicals as in the spectra for samples 2 and 3, nor peroxide radicals. Since the sample according to the invention, Sample 5, showed synergist radical and no evidence of phenoxyl radical, this confirms the hypothesis that the phenoxyl radical was exchanged for synergist radicals according to reaction (3), with the regeneration of initial phenolic inhibitor.

OXIDATION CATALYST DEACTIVATION

The synergistic action between the phenolic inhibitor and the preferred metal-complexing synergists of the present invention is partly based on decreasing the number of initial sites in the polymer. A Monte-Carlo simulation of polymer durability revealed that decreasing the number of initiation sites may substantially increase the efficiency of conventional inhibitors. The results of the simulation are shown in FIG. 1. The lower curve of FIG. 1 simulates a high concentration of initial centers ($n=100$, arbitrary concentration$=4\%$) and the upper curve simulates a lower concentration of initiation centers ($n=20$, concentration$=0.8\%$). The vertical axis shows durability, and the horizontal axis shows inhibitor concentration. The flattening of the lower curve suggests that at a high concentration of initiation centers, polymer durability can not be substantially increased by increasing the concentration of an inhibitor. In contrast at a lower concentration of initiation centers, as shown by the upper curve durability increased by orders of magnitude with increasing inhibitor concentration. This is one basis of the synergistic effect between conventional phenolic antioxidants and metal-complexing synergists that deactivate catalytic residues. In the preferred composition of the present invention, metal-complexing synergists deactivate transition metal ions that catalyze radical formation, thus reducing the number of radical initiation sites. This will lower the number of damaged zones and consequently increase time needed for defect merging into the catastrophic percolation cluster.

The synergists of the present invention are beneficial in polymer systems containing residual transition-metal ions, where the transition-metal ions act as sites for the initiation of oxidation reactions and the synergist acts to deactivate catalytic activity. It is well known that transition-metal ions catalyze the hydroperoxide decomposition into radicals and may also activate oxygen and catalyze its direct reaction with polyolefin macromolecules. Thus, in solid polymers where diffusion rate of radicals is restricted, a principal source of radical initiation is transition-metal ion-catalyzed reaction of radical formation. Oxidation of the polymer is not homogeneous throughout the matrix, but is heterogeneously distributed around initiation sites corresponding to the locations of the metal ions. The oxidized zones eventually become microdefects (primary transverse cracks). Polymer failure proceed as a result of formation of a percolation cluster of these microdefects.

In polymers with an oxidation inhibitor, the inhibitor is quickly consumed at the transition-metal initiation centers, after which chain autoxidation in these foci proceeds with a high rate until the polymeric substance is completely burned out. Meanwhile, in the surrounding matrix, the primary source of radicals is from diffusion from those zones with high oxidation rate. Radicals migrating from the initiation centers are trapped by oxidation inhibitor molecules, and until the oxidation inhibitor is consumed in some volume, the chain oxidation will not start in those regions away from the initiation centers to a significant extent. Thus, the front of oxidation moves slowly from initiation centers throughout the polymer matrix. Primary transverse cracks eventually reach a concentration at which they either come into direct contact or, if the polymer is under stress, induce the formation of secondary transverse cracks, leading eventually to failure of the polymer.

It has been found that in polymers under stress, damaged zones from oxidative degradation regions do not necessarily have to come into direct contact to result in a catastrophic break. The oxidation of stretched solid polymers, e.g. films and fibers, under external stress results in two different ways of defect merging: (1) the direct contact of damaged zones in a cross-section of the sample, or (2) the combination of damaged zones, located at a significant distance from each other by secondary longitudinal interfibrillar cracks, the formation of which is stimulated by oxidative degradation. In the case of (2), there is no direct contact of the deeply degraded zones. It is the formation of the secondary longitudinal cracks, that are believed to result in a lowered durability of stressed shapes in comparison with the case of (1).

The time to the formation of a catastrophic crack, the durability, depends on the concentration and distribution of radical initiation centers, their rate of growth and the mechanism of merging into the percolation cluster. The process leading to a catastrophic crack starts with oxidation at randomly distributed centers in polymer matrix, which correspond to the location of transition metal ions. The oxidation results in two types of cracks, primary transverse micro cracks induced by the oxidative degradation and secondary longitudinal microcracks, induced by mechanical stress around primary microcracks. Oxidation usually proceeds in the field of mechanical stress because oxidation is bound to polymer contraction. If oxidation proceeds unevenly in space, the result is a building up of mechanical stress in the polymer matrix. The growth of secondary cracks is much faster than that of primary cracks due to the anisotropy of strength of a stretched polymer, i.e., chemical C-C bonds are predominate along the fibrils, whereas in direction across the fibrils much weaker Van-der-Walls forces are more prevalent forces keeping the fibrils together.

In polymers containing oxidation inhibitor, the inhibitor is quickly consumed at the transition-metal initiation centers, leading to the deep degradation of these zones with the formation of primary transverse cracks there. Thus, the front of oxidation moves slowly from the initiation centers throughout the polymer matrix. If the polymer is under stress, primary transverse microcracks eventually reach a size and concentration at which they either come into direct contact or induce the formation of secondary longitudinal cracks. The formation of the percolation cluster of microcracks leads to polymer failure. Thus, rate of degradation leading to the catastrophic crack is limited by the growth and distribution of primary transverse microcracks formed in the vicinity of metal catalyst residue.

In polymeric systems with a slow migration rate of free-radicals, the reduction of the number of radical initiation sites by deactivation of residual transition-metal ions by the synergist, acting as metal complexing agent, may lead to a substantial increase of polymer life time, as discussed above. Catalyst deactivation by the preferred metal-complexing synergists will lower the number of the damaged zones from oxidation, and consequently the time is increased for the merger of these damaged zones into a catastrophic percolation.

As described above, suitable synergists include oxiquinones, sterically hindered catechols, sterically hindered derivative of bis(2-hydroxy-benzaldehyde) ethylene diimine, and sterically hindered o-benzoquine hydroxyanilides.

The suitable oxiquinones for the synergist are represented by the formula;

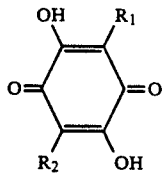

where $R_1$, and $R_2$, are the same or different and are chosen from the group consisting of hydrogen, alkyl, aryl, alkoxy, aryloxy, alkaryl, and aralkyl.

The suitable catechols are represented by the formula;

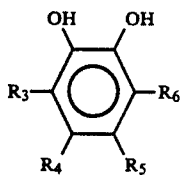

where $R_3$, $R_4$, $R_5$, and $R_6$ are the same or different and are chosen from the group consisting of hydrogen, alkyl, aryl, alkoxy, aryloxy, alkaryl, and aralkyl, wherein at least one of the members of the group consisting of $R_3$ and $R_6$ is a non-hydrogen radical chosen from bulky substituents such that the catechol is sterically hindered, such as tertalklyl (e.g. tertbutyl).

The suitable derivatives of bis(2-hydroxy-benzaldehyde) ethylene diimine for use as the synergist are represented by the formula;

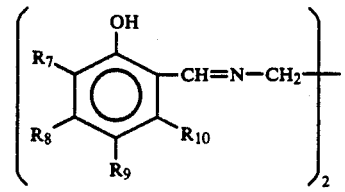

where $R_8$, $R_9$, and $R_{10}$ are the same or different and are chosen from the group consisting of hydrogen, alkyl, aryl, alkoxy, aryloxy, alkaryl, and aralkyl, and $R_7$ is a bulky substituent chosen from the group consisting of alkyl, aryl, alkoxy, aryloxy, alkaryl, and aralkyl, such that the derivative is sterically hindered, such as tertalklyl (e.g. tertbutyl).

The suitable o-benzoquine hydroxyanilides for use as the synergist are represented by the formula;

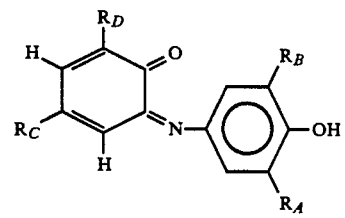

where $R_A$, $R_B$, $R_C$, and $R_D$ are the same or different and are chosen from the group consisting of hydrogen, alkyl, aryl, alkoxy, aryloxy, alkaryl, and aralkyl, wherein at least one of the members of the group consisting of $R_A$ and $R_B$ is a non-hydrogen radical chosen from bulky substituents such that the catechol is sterically hindered, such as tertalklyl (e.g. tertbutyl).

EXAMPLES

In the examples below the following were used:
PPR—A polypropylene believed to be manufactured by a liquid-phase process using a transition metal catalyst.
PPH—A polypropylene believed to be manufactured by a gas-phase process using a transition metal catalyst developed by Sumitomo.
Irganox 1010 TM —A phenolic oxidation inhibitor, 3,5 bis(1,1-Dimethylethyl)-4-hydroxybenzenepropanoic acid, 2,2-bis[[3-[3,5-bis(1,1-dimethylethyl)-4-hydroxyphenyl]-1-oxopropoxy]methyl]1,3-propanediylester. (CAS Number 6683-19-8). Disclosed in United States Patents 3,285,855 and 3,644,482 and available from Ciba-Geigy.
Irganox 1076 TM —A phenolic oxidation inhibitor, octadecyl 3,5-bis(1,1-dimethylethyl)-4-hydroxybenzenepropanoate. (CAS Number: 2082-79-3) Available from Ciba-Geigy.
OXQ-1—A sterically unhindered quinone synergist, 2,5-dihydroxy-1,4-benzonquinone.
OXQ-2—A sterically hindered quinone synergist, 3,6-di-tert-butyl-2,5-di-hydroxy-1,4-benzoquinone.
CAT-1—A sterically hindered catechol synergist, 3,6-di-tert-butylcatechol.

CAT-2—A sterically hindered catechol synergist, 3,5-di-tert-butylcatechol.

BHED—A synergist, bis(2-hydroxy-3,5-di-tert-butylbenzaldehyde) ethylene diimine.

OBH—A o-benzoquine hydroxyanilide synergist, [1-(3,5-di-tertbutyl-o-benzoquine)]-(4-hydroxy-3,5-di-tert-butyl)anilide.

COMPARATIVE EXAMPLE 1

Several polypropylene films with oxidation inhibitor and synergist were made and tested for durability. As a control, comparative compositions were made without oxidation inhibitor and without the synergist. The polypropylene was PPR. The phenolic oxidation inhibitor was Irganox TM 1076. The synergists were an oxiquinone and two catechols, specifically OXQ-1, CAT-1, and CAT-2. The concentration of catalyst residue in the polypropylene was 300 ppm as characterized by the ash number. Durability was measured on an apparatus that measured the time to fracture of a polymer while under stress. In the test, the degree of stretching ($\lambda$) was 5, the stress ($\sigma$) was 15 MPa, and the temperature (T) was 140° C.

The results are summarized in Table A below. The results are average value from five tests. The tests according to the invention are marked with (+).

TABLE A

| | Polypropylene Durability - A | | |
|---|---|---|---|
| Test | Synergist | (mol/kg) | Inhibitor (wt. %) | Durability (min) |
| 1 | — | — | — | 55 |
| 2 | — | — | 0.1 | 750 |
| 3 | OXQ-1 | 0.01 | — | 55 |
| 4 | OXQ-1 | 0.05 | — | 125 |
| +5 | OXQ-1 | 0.01 | 0.1 | 1800 |
| +6 | OXQ-1 | 0.05 | 0.1 | 3600 |
| 7 | CAT-1 | 0.01 | — | 390 |
| 8 | CAT-1 | 0.05 | — | 530 |
| +9 | CAT-1 | 0.01 | 0.1 | 1100 |
| +10 | CAT-1 | 0.05 | 0.1 | 1900 |
| 11 | CAT-1 | 0.01 | — | 270 |
| 12 | CAT-2 | 0.05 | — | 730 |
| +13 | CAT-2 | 0.01 | 0.1 | 2000 |
| +14 | CAT-2 | 0.05 | 0.1 | 6800 |

Referring to the results in Table A, the oxiquinone (OXQ-1) shows no or little oxidation inhibitory effect by itself in polypropylene (3,4). Polypropylene samples according to the invention (5,6) that contained the oxiquinone synergist combined with the oxidation inhibitor showed a pronounced synergism with a dramatic improvement of durability over polypropylene with either the oxidation inhibitor (2), or the synergist alone (3,4).

The tests where the catechol synergists were without the phenolic oxidation inhibitor (6,7,10,12), showed that the catechols by themselves have a mild stabilizing effect. However, in the tests according to the invention with synergist and inhibitor (9, 10, 13, 14), a strong synergism between the oxidation inhibitor and the catechols is shown by the dramatically improved durability.

COMPARATIVE EXAMPLE 2

Several polypropylene films according to the present invention were made and tested for durability. As a control, comparative compositions were made without oxidation inhibitor and without synergist. The polymer was a polypropylene (PPH), believed to be manufactured by a gas-phase process. The oxidation inhibitor was Irganox 1010 TM. The synergist was OXQ-2. The concentration of catalyst residue in the polypropylene was 80 ppm as characterized by the ash number. Durability was measured as in Example 2. In the test $\lambda=6$, and $\sigma=15$ MPa, and T=140° C. A hydroperoxide decomposer, dilaurilthiodipropionate, was also added to the compositions.

The results are summarized in Table B below. The results are the average of ten tests. The test according to the invention is marked by (+).

TABLE B

| | Polypropylene Durability - B | | |
|---|---|---|---|
| Test | Synergist | (mol/kg) | Inhibitor (wt. %) | Durability (min) |
| 15 | — | — | — | 80 |
| 16 | — | — | 0.1 | 250 |
| 17 | OXQ-2 | 0.01 | — | 72 |
| +18 | OXQ-2 | 0.01 | 0.1 | 610 |

Referring to the results in Table B, test 18 according to the invention shows a pronounces synergism of the synergist and the phenolic oxidation inhibitor, by comparison of the durability in the comparative tests.

COMPARATIVE EXAMPLE 3

Films of polypropylene containing a phenolic oxidation inhibitor, and a synergist were made and tested for durability. The oxidation inhibitor was Irganox 1076 TM, and the synergist was BHED.

BHED was synthesized by condensation of 2-hydroxy-3,5-di-tert-butylbenzaldehyde with diethylamine with almost stoichiometric yield. Typical protocol of synthesis of BHED is as follows; 7.02 g of 2-hydroxy-3,5-di-tert-butylbenzaldehyde was dissolved in 50 ml of o-dichlorobenzene at slight heating. 1 ml of diethylamine was added to the solution and the mixture was heated to 90° C. at constant stirring and maintained at this temperature for one hour. A bright yellow powder of a condensation product was formed with almost a stoichiometric yield (higher than 90%). After cooling to room temperature, product was filtered out, purified by recrystallization and dried in air.

Durability test were conducted under same conditions as in Example 1. The results of the durability tests of the films are summarized in Table C.

TABLE C

| | Polypropylene Durability - C | | |
|---|---|---|---|
| Test | Synergist | (mol/kg) | Inhibitor (wt. %) | Durability (min) |
| 1 | — | — | — | 55 |
| 2 | — | — | 0.1 | 750 |
| 19 | BHED | 0.01 | — | 90 |
| +20 | BHED | 0.01 | 0.01 | 2100 |

As seen from the results, the films with combination of BHED and the phenolic antioxidant show a strong synergistic effect over the films with either BHED synergist or phenolic antioxidant alone.

COMPARATIVE EXAMPLE 4

Films of polypropylene containing a phenolic oxidation inhibitor and a synergist were made tested for durability. The oxidation inhibitor was Irganox 1076 TM, and the synergist was an o-benzoquine hydroxyanilide (OBH). Synthesis of OBH can be performed from 3,5-di-tert-butyl-o-benzoquinone and (4-hydroxy-3,5-di-tert-butyl)aniline.

Durability test were conducted under same conditions as in Example 1. The results of the durability tests of the films are summarized in Table D.

TABLE D

| Polypropylene Durability - D | | | |
|---|---|---|---|
| Test | Synergist Agent | Inhibitor (mol/kg) | Durability (mol/kg) (min) |
| 1 | — | — | — 55 |
| 2 | — | — | 0.1 750 |
| 21 | OBH | 0.01 | — 250 |
| +22 | OBH | 0.01 | 0.01 2700 |

As seen from the results, the films with combination of BHED and the phenolic antioxidant show a strong synergistic effect over the films with either OBH synergist or phenolic antioxidant alone.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention. For example, the synergistic combination of phenolic oxidation inhibitor and synergist may also be effective for polymers other than polyolefins that are oxidation inhibited by phenolic oxidation inhibitors in a manner similar to that illustrated by Equations (1) and (2) above. These polymer systems would be expected to benefit by the regeneration of the phenolic oxidation inhibitor. In particular, such polymers that contain catalyst transition-metal residues from the catalyst are contemplated.

In addition, it is believed that a portion of the oxidation inhibition affected by the synergist is due to alkyl radical trapping. Accordingly, it would be expected that the composition defined as synergists in this application would be effective, alone or combination with other oxidation inhibitors, in the process of the polymers to inhibit degradation in the polymer melt.

What is claimed is:

1. A composition comprising;
   (a) a polyolefin;
   (b) a phenolic oxidation inhibitor for polyolefins having at least one phenolic group that is reactive with free radicals of the polyolefin to form phenoxyl radicals;
   (c) a catechol synergist represented by the formula;

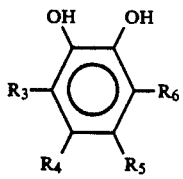

where $R_3$, $R_4$, $R_5$, and $R_6$ are the same or different and are chosen from the group consisting of hydrogen, alkyl, aryl, alkoxy, aryloxy, alkaryl, and aralkyl, wherein at least one of the members of the group consisting of $R_3$ and $R_6$ is a non-hydrogen radical chosen from bulky substituents such that the catechol is sterically hindered.

2. A composition comprising;
   (a) a polyolefin;
   (b) a phenolic oxidation inhibitor for polyolefins having at least one phenolic group that is reactive with free radicals of the polyolefin to form phenoxyl radicals;
   (c) an oxiquinone synergist represented by the formula;

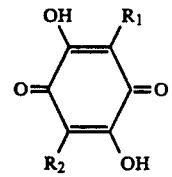

where $R_1$ and $R_2$ are the same or different and are chosen from the group consisting of hydrogen, alkyl, aryl, alkoxy, aryloxy, alkaryl, and aralkyl.

3. The composition of claim 1 wherein the polyolefin is chosen from the group consisting of polyethylene, and polymers of α-olefins.

4. The composition of claim 1 wherein the polyolefin is chosen from the group consisting of low-density polyolefin, high-density polyethylene, propylene, 1-butene, 4-methylpentene, and random and block copolymers of same.

5. The composition of claim 1 wherein the polymer contains a transition-metal.

6. The composition of claim 5 wherein the transition-metal ion is a residue from a catalyst used to manufacture the polymer and is present in an amount between about 30 ppm and about 300 ppm, as measured by the ash number.

7. The composition of claim 1 wherein the phenolic oxidation inhibitor is present in an amount greater than about 0.001 mols/kg polyolefin.

8. The composition of claim 1 wherein the catechol synergist is present in an amount greater than about 0.01 mol/kg.

9. The composition of claim 1 wherein the catechol synergist is present in an amount between about 0.01 mol/kg and about 0.05 mol/kg.

10. The composition of claim 1 wherein the phenolic oxidation inhibitor is chosen from the group consisting of monophenolic antioxidants, methylene-bis-phenolic antioxidants, tris-phenolic antioxidants, and tetraphenolic antioxidants.

11. The composition of claim 1 wherein the phenolic oxidation inhibitor is chosen from the group consisting of di-tert-butyl-p-cresol, 2,2'-methylene-bis(4-methyl-6-tert-butylphenol), 4,4'-methylene-bis(2,6'-di-tert-butylphenol), 4,4'-methylene-bis(2,6-di-tert-butylphenol), 2,6-bis(2'-hydroxy-3'-tert-butyl-5'-methylbenzyl)-4-methylphenol, 1,1,3-tris(2-methyl-4-hydroxy-5-tert-butylphenyl)butane, 2,2'-methylene-bis(4-methyl-6-cyclohexylphenol), 4,4'-methylene-bis(2-methyl-6-tert-butylphenol), 6-(4-hydroxy-3,5-di-tert-butylphenylcyclohexylamino)-2,4-bis(n-octylthio)-1,3,5-triazine, (4-hydroxy-3,5-di-tert-butyl) benzylphosphonic acid di-n-octodecyl ester, 3,5 bis(1,1-Dimethylethyl)-4-hydroxybenzenepropanoic acid, 2,2-bis[[3-[3,5-bis(1,1-dimethylethyl)-4-hydroxyphenyl]-1-oxopropoxy]methyl]1,3-propanediyl ester, and octadecyl 3,5-bis(1,1-dimethylethyl)-4-hydroxybenzene-propanoate.

* * * * *